United States Patent
Yoshimura et al.

(10) Patent No.: US 10,091,931 B2
(45) Date of Patent: Oct. 9, 2018

(54) LAWN MOWER

(71) Applicant: Honda Motor Co., Ltd., Tokyo (JP)

(72) Inventors: Hajime Yoshimura, Wako (JP); Koji Kuriyagawa, Wako (JP); Satoshi Onodera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 15/442,872

(22) Filed: Feb. 27, 2017

(65) Prior Publication Data

US 2017/0245432 A1    Aug. 31, 2017

(30) Foreign Application Priority Data

Feb. 29, 2016 (JP) .................. 2016-037376

(51) Int. Cl.
| | | |
|---|---|---|
| *A01D 34/76* | (2006.01) | |
| *A01D 34/63* | (2006.01) | |
| *A01D 34/64* | (2006.01) | |
| *A01D 34/71* | (2006.01) | |
| *A01D 34/81* | (2006.01) | |
| *A01D 43/063* | (2006.01) | |
| *A01D 34/68* | (2006.01) | |

(Continued)

(52) U.S. Cl.
CPC .............. *A01D 34/76* (2013.01); *A01D 34/64* (2013.01); *A01D 34/6806* (2013.01); *A01D 34/71* (2013.01); *A01D 34/73* (2013.01); *A01D 34/81* (2013.01); *A01D 43/063* (2013.01); *A01D 2101/00* (2013.01)

(58) Field of Classification Search
CPC ........ A01D 34/00; A01D 34/68; A01D 34/73; A01D 34/76; A01D 34/001; A01D 34/008; A01D 34/63; A01D 34/82; A01D 34/006; A01D 34/005; A01D 34/6806; A01D 43/0631; A01D 2101/00; A01D 34/6812
USPC ................. 56/10.2 R, 10.4, 196, 289, 295
See application file for complete search history.

(56) References Cited

U.S. PATENT DOCUMENTS 3,385,043 A * 5/1968 Seymore ............... A01D 34/005
                                                          56/503
3,389,541 A * 6/1968 Freedlander ........... A01D 34/73
                                                          56/295

(Continued)

FOREIGN PATENT DOCUMENTS

JP    2002-315416 A    10/2002
JP      3771529 B2      4/2006

*Primary Examiner* — John Weiss
(74) *Attorney, Agent, or Firm* — Westerman, Hattori, Daniels & Adrian, LLP

(57) ABSTRACT

A lawn mower includes a hollow shaft, a cutter blade, flaps, a belt type continuously variable transmission, and a transmission mechanism. The cutter blade extends along a horizontal line which is perpendicular to the hollow shaft. The flaps are provided for the cutter blade. Each of the flaps has a flap angle changeable along the horizontal line. A control force converter unit of the belt type continuously variable transmission converts a displacement force of the movable sheave relative to the fixed sheave in an axial direction into a control force that controls the flap angle of the flaps. The transmission mechanism is accommodated inside the hollow shaft, and transmits the control force to the flaps.

4 Claims, 9 Drawing Sheets

(51) Int. Cl.
*A01D 34/73* (2006.01)
*A01D 101/00* (2006.01)

(56) References Cited

U.S. PATENT DOCUMENTS

| | | | | |
|---|---|---|---|---|
| 3,724,182 | A * | 4/1973 | Long | A01D 42/00 37/243 |
| 5,040,364 | A * | 8/1991 | Deegan | A01D 43/0631 56/320.2 |
| 5,377,774 | A * | 1/1995 | Lohr | B62D 51/004 180/19.1 |
| 5,950,408 | A * | 9/1999 | Schaedler | A01D 34/64 56/10.2 R |
| 7,275,355 | B2 | 10/2007 | Adams et al. | |
| 2002/0153179 | A1 | 10/2002 | Kobayashi et al. | |
| 2003/0182916 | A1 | 10/2003 | Iida et al. | |
| 2004/0187463 | A1* | 9/2004 | Eddy | A01D 34/73 56/295 |
| 2005/0066643 | A1* | 3/2005 | Fukushima | A01D 34/006 56/16.7 |
| 2012/0000173 | A1* | 1/2012 | Papke | A01D 34/82 56/14.7 |

\* cited by examiner

LAWN MOWER

CROSS-REFERENCE TO RELATED APPLICATION

This application is based upon and claims the benefit of priority from Japanese Patent Application No. 2016-037376 filed on Feb. 29, 2016, the contents of which are incorporated herein by reference.

BACKGROUND OF THE INVENTION

Field of the Invention

The present invention relates to a technique of a rotary lawn mower for cutting lawn grass by a cutter blade accommodated in a housing.

Description of the Related Art

The rotary lawn mower cuts (clips) lawn grass by rotating a cutter blade accommodated in a housing having an opened bottom, along lawn grass to cut the lawn grass. As a technique of such a lawn mower, for example, U.S. Pat. No. 7,275,355 is known.

The lawn mower known in U.S. Pat. No. 7,275,355 includes a housing having an opened bottom, a rotation shaft positioned inside the housing and extending in a vertical direction of the housing, and a cutter blade accommodated in the housing in a manner that the cutter blade is rotatable about the rotation shaft. The lawn grass (grass clippings) cut by the cutter blade is lifted upward, and swirled in the housing by the air lifts, and then, transported into a grass clippings container.

A belt type continuously variable transmission is provided in a working power transmission system from the drive source to the rotation shaft. This belt type continuously variable transmission includes a drive pulley provided for the drive source, a driven pulley provided for the rotation shaft, and a belt hooked between these pulleys. The driven pulley includes a fixed sheave provided for the rotation shaft, a movable sheave which is displaceable relative to the fixed sheave in an axial direction, and a device for driving the driven pulley to move closer to the drive pulley. This device is a mechanism which moves in a linear fashion such as a solenoid or a linear actuator, and the device is controlled by a control unit. This control unit can control the rotation speed of the cutter blade by controlling the device in accordance with various factors such as a lawn mowing load applied to the cutter blade.

SUMMARY OF THE INVENTION

However, a lawn mower known in the specification of U.S. Pat. No. 7,275,355 only controls the rotation speed of a cutter blade. When the rotation speed of the cutter blade is decreased, it is not possible to generate swirl wind for transporting grass clippings to a grass clippings container efficiently.

An object of the present invention is to provide a technique of efficiently generating swirl wind for swirling grass clippings in a housing, and transporting the grass clippings into the grass clippings container in accordance with working condition of lawn mowing operation.

In the present invention, the lawn mower includes a housing having an opened bottom, a rotation shaft extending in a vertical direction of the housing and having a lower end positioned within the housing, a cutter blade provided for the rotation shaft and accommodated in the housing, a belt type continuously variable transmission provided in a working power transmission system from the drive source to the rotation shaft. The belt type continuously variable transmission is capable of changing a reduction ratio of a driven pulley to a drive pulley in a continuous manner. The cutter blade extends along a horizontal line which is perpendicular (or substantially perpendicular) to the rotation shaft.

The driven pulley includes a fixed sheave provided for the rotation shaft, a movable sheave which is displaceable relative to the fixed sheave in an axial direction, and a torque cam mechanism configured to partially convert a rotation force applied to the movable sheave into a thrust that presses a side surface of a V-belt. Further, the lawn mower includes a flap provided for at least part of the cutter blade, in a manner that the flap has a flap angle changeable along the horizontal line, a control force converter unit configured to convert a displacement force of the movable sheave relative to the fixed sheave in the axial direction into a control force that controls the flap angle of the flap, and a transmission mechanism configured to transmit the control force of the control force converter unit to the flap.

In the structure, the movable sheave is displaced to move closer to, and away from the fixed sheave in accordance with the increase/decrease of the lawn mowing load applied to the cutter blade. The effective diameter of the driven pulley changes in accordance with the change amount of the movable sheave. As a result, it is possible to change the reduction ratio of the driven pulley relative to the drive pulley continuously. Further, the displacement force of the movable sheave is transmitted to the flap through the control force converter unit and the transmission mechanism. As a result, it is possible to continuously change the flap angle of the flap in accordance with the displacement amount of the movable sheave continuously. As described above, in the present invention, it is possible to change the rotation speed of the cutter blade automatically, and change the flap angle of the flap automatically, in accordance with the increase/decrease of the lawn mowing load.

That is, in accordance with the increase of the lawn mowing load, the movable sheave is spaced from the fixed sheave. As a result, it is possible to reduce the rotation speed of the cutter blade, and hence, reduce the load on the cutter blade. Further, it is possible to increase the flap angle of the flap (change the orientation of the flap to stand upright). Therefore, even if the rotation speed of the cutter blade is reduced, it is possible to efficiently generate the swirl wind for swirling the lawn grass (grass clippings) cut by the cutter blade in the housing, and transporting the grass clippings into the grass clippings container. Further, there is no need to adopt any complicated control system for changing the rotation speed of the cutter blade and the flap angle of the flap automatically, and hence, it is sufficient to adopt a simple mechanism.

Further, at the time of the low load, e.g., when the cutter blade is rotated idly and no lawn mowing operation is performed, by decreasing the flap angle of the flap, it is possible to reduce the noises such as wind noises. Further, it is possible to improve the noise suppression performance regardless of the rotation speed of the cutter blade.

Further, the rotation shaft comprises a hollow shaft. The transmission mechanism is accommodated inside the hollow shaft. That is, the transmission mechanism is provided by utilizing the rotation shaft effectively. In the structure, by accommodating the transmission mechanism which transmits the control force of the control force converter unit to the flap, in the hollow rotation shaft, it is possible to efficiently provide the transmission mechanism in a compact space in the housing efficiently. Further, since the transmission mechanism is not exposed into the housing, there is no concern of jamming of the grass clippings between the transmission mechanism and the housing. Further, the swirl wind generated by the cutter blade or the flap can flow smoothly into the housing without being obstructed by the transmission mechanism. Therefore, though the transmission mechanism is present, it is possible to store the grass clippings efficiently in the grass clippings container by allowing the grass clippings to fly on the swirl wind flowing smoothly.

Preferably, the transmission mechanism includes a control shaft fitted into the hollow shaft in a manner that the control shaft is slidable in the axial direction, and a converter mechanism accommodated inside the hollow shaft in a manner that sliding movement of the control shaft can be converted into movement to change the flap angle of the flap. A lower end of the control shaft is coupled to the flap through the converter mechanism. A conversion shaft of the control force converter unit is combined with an upper end of the control shaft in a manner that the control shaft can be driven in a sliding manner.

In the structure, the control force conversion unit drives the control shaft in a sliding manner, and the conversion mechanism can convert the sliding movement of the control shaft into movement to change the flap angle of the flap. As a result, the flap angle of the flap can be changed by the control force conversion unit. The transmission mechanism includes a control shaft fitted into the hollow shaft in a manner that the control shaft is slidable in an axial direction of the hollow shaft, a converter mechanism accommodated inside the hollow shaft. Therefore, by effectively utilizing the inner space of the hollow rotation shaft, the transmission mechanism can be stored efficiently.

Preferably, the converter mechanism comprises a pin extending radially outside from the lower end of the control shaft and a cam including a cam surface which can contact the pin. The cam is supported by the hollow shaft rotatably about a swing center of the flap. The cam is provided at the flap. The cam surface comprises a cam groove capable of converting sliding movement of the pin which is displaced in a sliding manner together with the control shaft into rotation movement of the cam.

In the structure, by the cam mechanism including the pin and the cam, it is possible to form the simple and compact conversion mechanism. Further, the sliding movement of the control shaft can be converted into movement of changing the flap angle of the flap.

Preferably, the lawn mower includes a lower cutter blade positioned below the cutter blade. The lower cutter blade comprises a fixed blade fixed to the hollow shaft.

When the cutter blade having the flap is rotated, it is possible to generate the upward air flow by the flap. The magnitude of this upward air flow depends on the degree of the flap angle of the flap. Negative pressure is generated below the cutter blade by the upward air flow. In correspondence with the magnitude of this negative pressure, the degree in which the lawn grass growing on the ground stands upright changes. In order to ensure that the lawn grass after lawn mowing operation has the constant height as much as possible, the height of the housing having the cutter blade should be adjusted finely.

In this regard, the lower cutter blade is positioned below the cutter blade. This lower cutter blade comprises a fixed blade which does not have any flap. Therefore, the magnitude of the negative pressure generated below the lower cutter blade by the upward air flow is substantially constant. The degree in which the lawn grass growing on the ground stands upright is substantially constant. It is possible to maintain the constant height of lawn grass after lawn mowing operation as much as possible.

Therefore, it is possible to efficiently generate the swirl wind by the flap of the upper cutter blade, and ensure that the lawn grass has the constant height after lawn mowing operation by the lower cutter blade as much as possible.

In the present invention, it is possible to generate swirl wind efficiently for swirling cut lawn grass in the housing and transporting the lawn grass to the grass clippings container, in accordance with the working condition of lawn mowing operation. Further, there is no need to adopt any complicated control system for changing the flap angle of the flap automatically, and hence, it is sufficient to adopt a simple mechanism.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment for carrying out the present invention will be described with reference to the accompanying drawings.

A lawn mower according to the embodiment will be described with reference to the drawings. It should be noted that, in the following description, the words "front", "rear", "left", "right", "upper", and "lower" are used to refer to directions as viewed from a human operator. "Fr" denotes the front side, "Rr" denotes the rear side", "Le" denotes the left side, "Ri" denotes the right side, and the "CL denotes" the center of the machine width (central line of the machine width).

Figure 1:
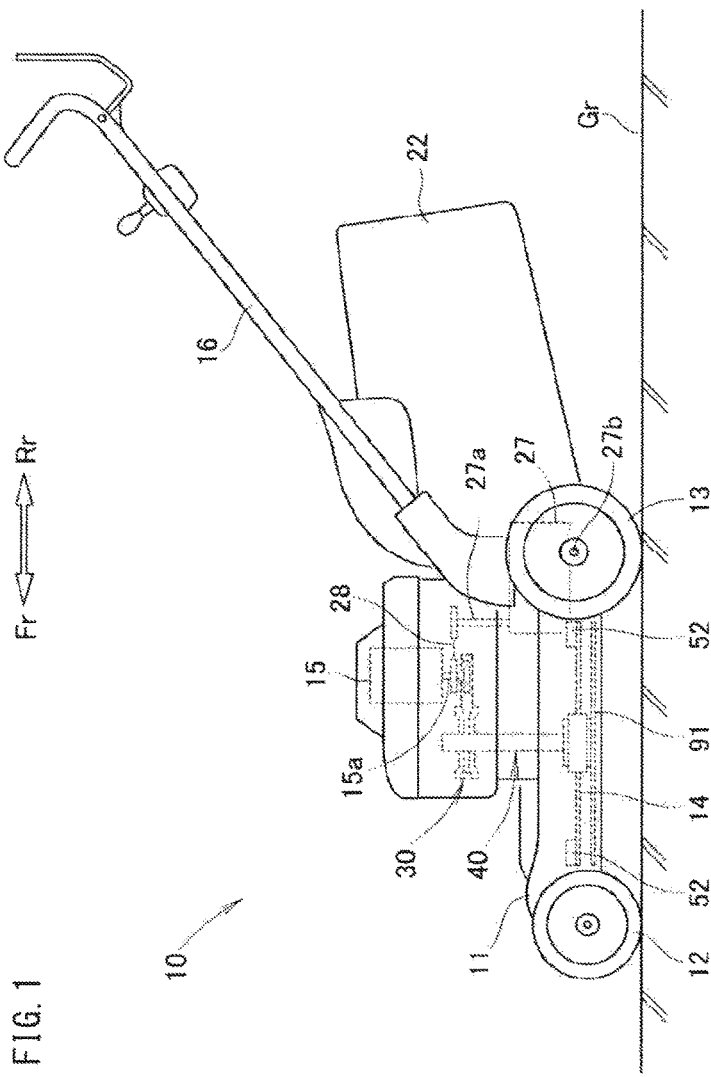
FIG. 1 is a left side view of a lawn mower of the present invention.
Figure 2:
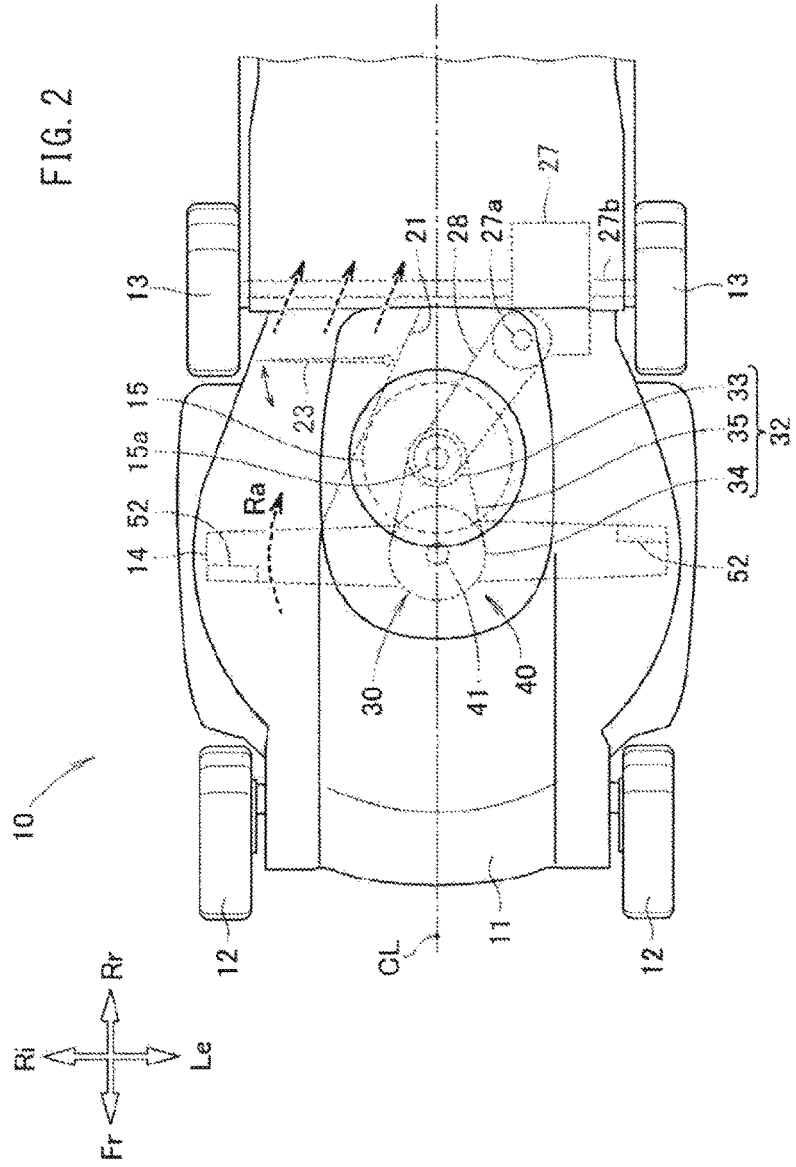
FIG. 2 is a plan view of the lawn mower shown in FIG. 1.

As shown in FIGS. 1 and 2, a lawn mower 10 is a walk-behind, self-propelled working machine for cutting lawn grass. The lawn mower 10 includes a housing 11, left and right wheels 12 provided on the front side of the housing 11, left and right wheels 13 provided on the back side of the housing 11, a cutter blade 14 accommodated inside the center of the housing 11 for cutting lawn grass, a drive source 15 (engine 15) provided above the housing 11, and an operation handle 16 extending backward from the housing 11. In the following description, a case where the drive source 15 is an engine is taken as an example. It should be noted that the drive source 15 is not limited to the engine. For example, the drive source 15 may be an electric motor.

As shown in FIG. 2, in a plan view, this lawn mower 10 rotates the cutter blade 14 clockwise by the engine 15 to cut (clip) the lawn grass, and generates flows of the air (swirl air flow or swirl wind) in the housing 11 as indicated by an arrow Ra. By the swirl air flow, the lawn grass cut by the cutter blade 14 can be delivered to, and stored in a grass clippings container 22 through a grass clippings discharge passage 21. Hereinafter, the lawn grass cut (clipped) by the cutter blade 14 will be referred to as the "grass clippings".

As shown in FIG. 1, this housing 11 is a so-called opened bottom housing where only the lower end surface (surface facing the lawn ground Gr) of the housing 11 is opened entirely. This housing 11 is a member having a spiral shape in a plan view, i.e., a spiral case (scroll case). The housing 11 has a scroll section for swirling the lawn grass cut by the cutter blade 14 by the swirl wind, and transporting the lawn grass (grass clippings) toward the grass clippings discharge passage 21. Structure of this housing 11 is well known (see Japanese Patent No. 3771529).

As shown in FIG. 2, a mode switch damper 23 is provided for the grass clippings discharge passage 21. This mode switch damper 23 can be operated by an unillustrated operation lever. By operating the operation lever, it is possible to switch the operating mode as necessary, between (1) a bagging mode for opening the mode switch damper 23 to store the grass clippings in the grass clippings container 22 and (2) a mulching mode for closing the mode switch damper 23 to discharge the grass clippings to a position below the housing 11.

Figure 3:
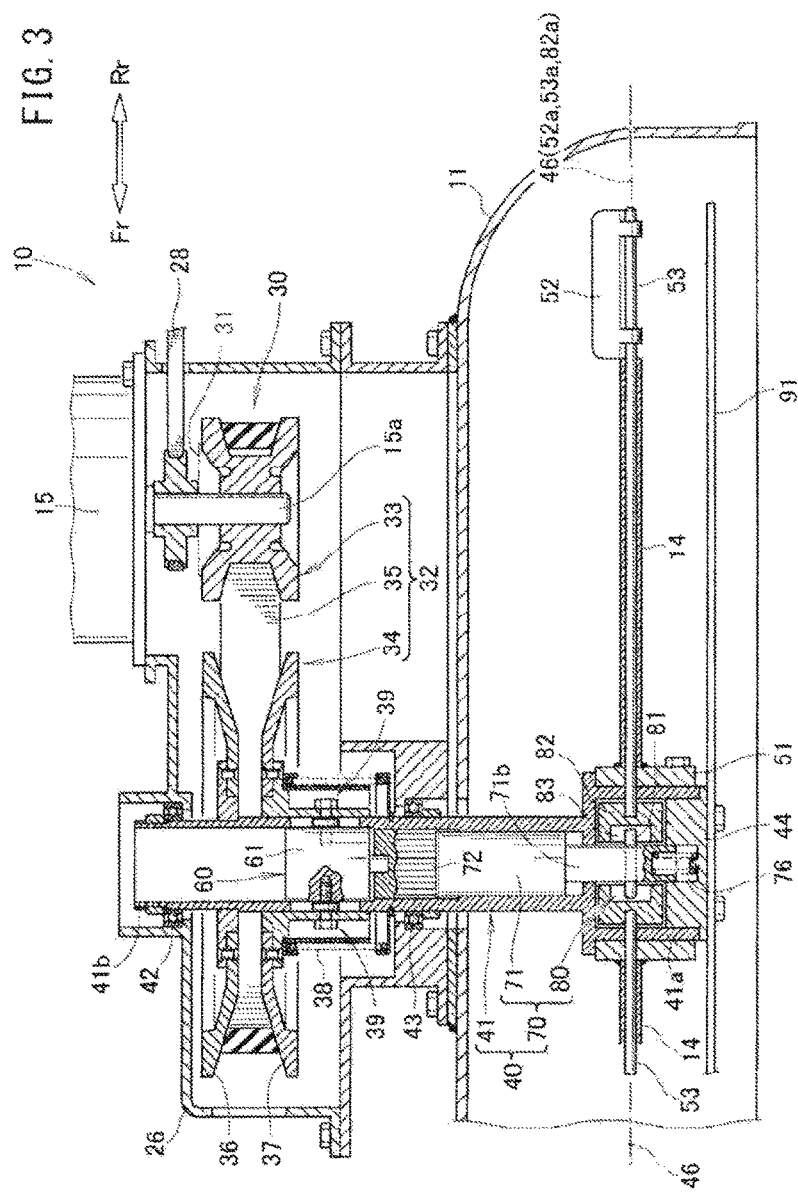
FIG. 3 is a cross sectional view showing a drive source, a cutter mechanism, and an area around a cutter blade shown in FIG. 1.

As shown in FIG. 3, this housing 11 also serves as a machine body, and includes a stand 26 at an upper position. The engine 15 is mounted on an upper end surface of this stand 26. The engine 15 has an output shaft 15a extending from its lower end toward the lawn ground Gr (ground Gr) into the housing 11. The output shaft 15a is a rotation shaft positioned above the housing 11, and extends in a vertical direction (in an up-down direction) of the housing 11. Consequently, the output shaft (rotation shaft) 15a is substantially perpendicular to the horizontal lawn ground Gr.

As shown in FIGS. 1 and 3, the left and right rear wheels 13 are travel drive wheels. That is, the power generated by the engine 15 is transmitted to the left and right rear wheels 13 through a transmission 27 (hydraulic continuously variable transmission 27). An input shaft 27a of the hydraulic continuously variable transmission 27 is coupled to the output shaft 15a of the engine 15 by a belt 28. This hydraulic continuously variable transmission 27 can switch (reverse) the rotation direction of an output shaft 27b (wheel shaft 27b) outputted to the rear wheels 13, in response to the rotation direction of the input shaft 27a driven by the engine 15, and switch (change the transmission) of the rotation speed of the output shaft 27b continuously, in response to the rotation speed of the input shaft 27a. The structure of this hydraulic continuously variable transmission 27 is well known (e.g., see Japanese Laid-Open Patent Publication No. 2002-315416).

As shown in FIG. 3, the power generated by the engine 15 is transmitted to a cutter mechanism 40 by a working power transmission system 30. A clutch 31 and a belt type continuously variable transmission 32 are provided in the working power transmission system 30 from the engine 15 to a rotation shaft 41 of the cutter mechanism 40. This belt type continuously variable transmission 32 is attached to the output shaft 15a of the engine 15 through the clutch 31. When the clutch 31 is in the OFF state, the rotation shaft 41 is released from the output shaft 15a of the engine 15. When the clutch 31 in the ON state, the rotation shaft 41 is coupled to the output shaft 15a of the engine 15 through the belt type continuously variable transmission 32.

Figure 4:
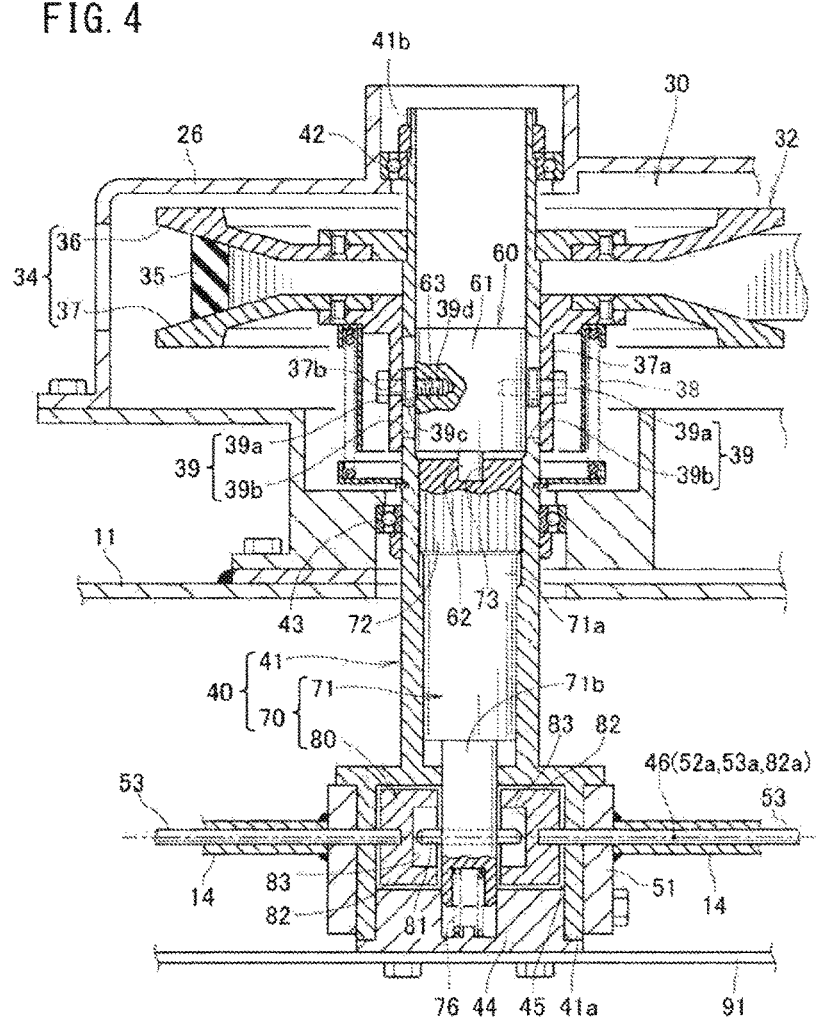
FIG. 4 is a cross sectional view in which the cutter mechanism and the area around the cutter blade shown in FIG. 3 are enlarged.

As shown in FIGS. 3 and 4, the belt type continuously variable transmission 32 includes a drive pulley 33 attached to the output shaft 15a of the engine 15 through the clutch 31, a driven pulley 34 attached to an upper end of the rotation shaft 41, and a V-belt 35 hooked between the drive pulley 33 and the driven pulley 34. The belt type continuously variable transmission 32 can change a reduction ratio of the driven pulley 34 to the drive pulley 33 in a continuous manner. The power generated by the engine 15 is transmitted from the drive pulley 33 to the rotation shaft 41 through the V-belt 35 and the driven pulley 34 for enabling rotation of the rotation shaft 41.

The driven pulley 34 includes a fixed sheave 36 provided for the rotation shaft 41, a movable sheave 37 which is displaceable relative to the fixed sheave 36 in an axial direction, a compression coil spring 38 (return spring 38) for biasing the movable sheave 37 toward the fixed sheave 36, and a torque cam mechanism 39 for partially converting a rotation force applied to the movable sheave 37 into a thrust for pressing a side surface of the V-belt 35.

Specifically, the rotation shaft 41 is a hollow shaft. That is, at least a lower end 41a and an upper end 41b of the rotation shaft 41 are opened.

Figure 5:
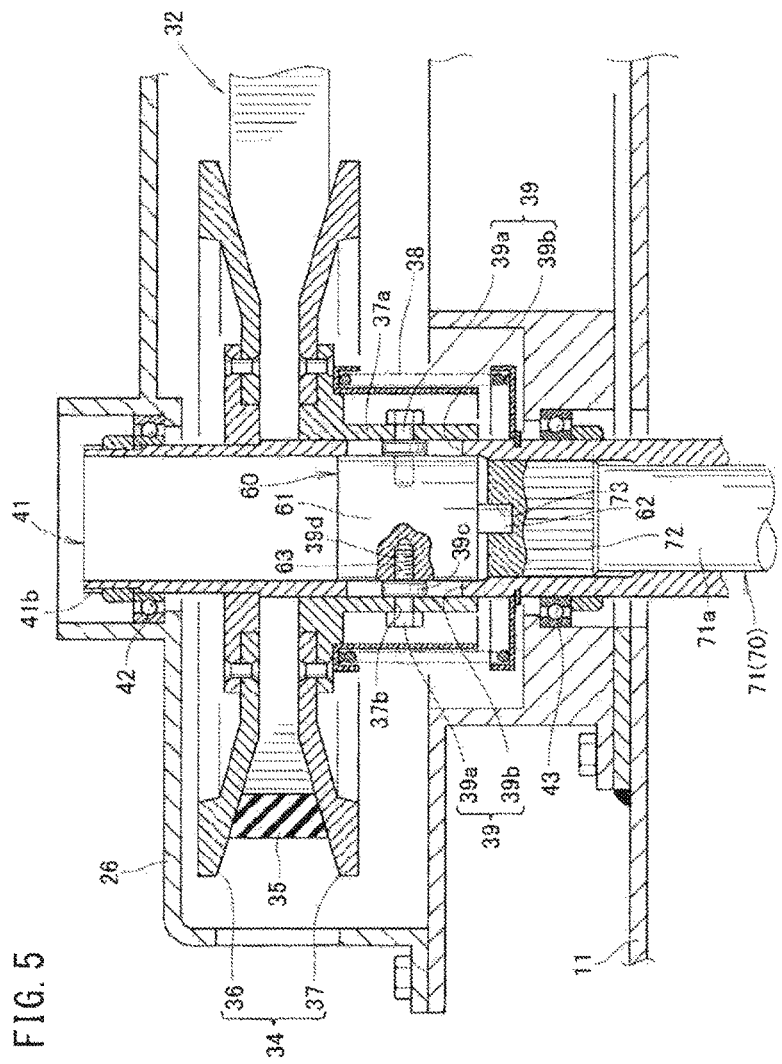
FIG. 5 is an enlarged cross sectional view showing an area around a belt type continuously variable transmission shown in FIG. 3.
Figure 6:
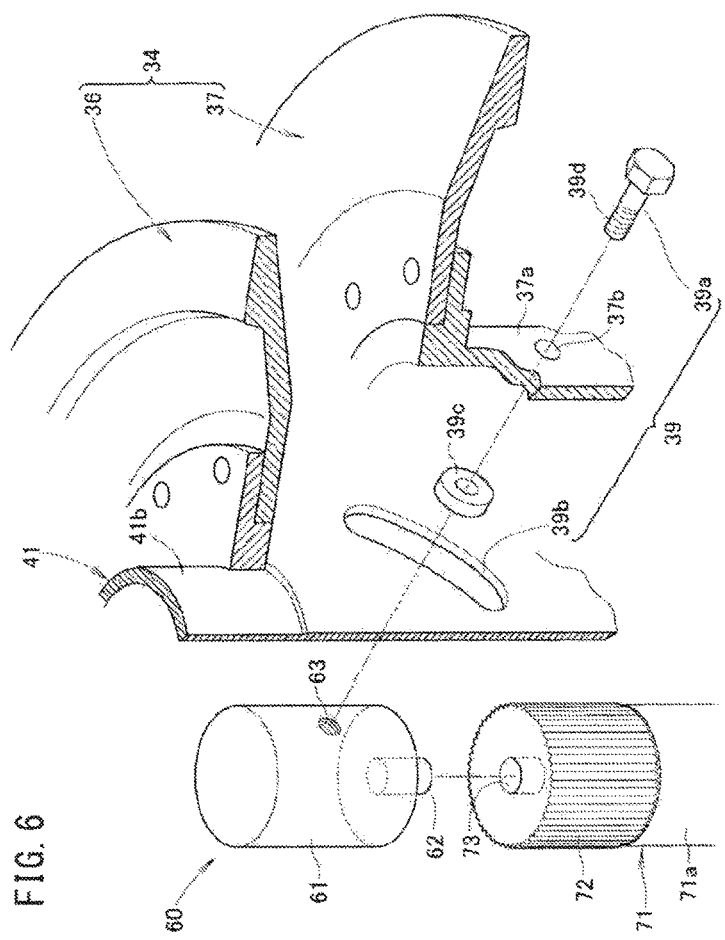
FIG. 6 is an exploded perspective view where a torque cam mechanism and a control force converter unit shown in FIG. 5 are enlarged, and partially broken away.

As shown in FIGS. 5 and 6, the fixed sheave 36 and the movable sheave 37 are supported by the rotation shaft 41. Both of relative rotation of the fixed sheave 36 relative to the rotation shaft 41 and the relative movement of the fixed sheave 36 in the axial direction are restricted. The movable sheave 37 has a cylindrical boss 37a fitted to the rotation shaft 41 rotatably. Though this movable sheave 37 is rotatable relative to the rotation shaft 41, and displaceable in the axial direction of the rotation shaft 41, the displacement of the movable sheave 37 is restricted by the torque cam mechanism 39. The coil center of the compression coil spring 38 is provided coaxially with the center of rotation of the driven pulley 34.

The torque cam mechanism 39 includes one or a plurality of pins 39a extending radially inward from the boss 37a of the movable sheave 37, and one or a plurality of cam grooves 39b formed in the hollow shaft 41 (rotation shaft 41).

More specifically, a perfect circular pin support hole 37b extends radially through the boss 37a. The pin 39a is fitted to the pin support hole 37b, and supported by the pin support hole 37b. Further, the pin 39a protrudes radially inward, and the pin 39a is fitted into the cam groove 39b. In the structure, the pin 39a and the movable sheave 37 are guided by the cam groove 39b, and displaceable.

Preferably, this cam groove 39b passes through the hollow shaft 41 in a radial direction, and is formed in an elongated shape. The cam groove 39b is inclined in the axial direction of the hollow shaft 41 (The cam groove 39b is formed in a spiral pattern).

Preferably, a rotatable body 39c such as a roller or a bearing is provided at a portion of the pin 39a fitted to the cam groove 39b. This rotatable body 39c is attached rotatably to the pin 39a. In this manner, it is possible to reduce the friction resistance between the pin 39a and the cam groove 39b as much as possible.

Referring also to FIG. 3, when the engine 15 drives the cutter blade 14 through the belt type continuously variable transmission 32, a reaction force corresponding to the magnitude of the load on the cutter blade 14 is applied to the torque cam mechanism 39. Therefore, the pin 39a is guided by the cam groove 39b, rotated, and displaced in the axial direction in a sliding manner. That is, part of the rotational force applied from the engine 15 to the movable sheave 37 is converted by the torque cam mechanism 39 into a thrust fs1 for pressing a side surface of the V-belt 35. The total sum of the thrust fs1 and the bias force fs2 for biasing the movable sheave 37 by the compression coil spring 38 is Σfs (total thrust is Σfs). The effective belt diameter of the driven pulley 34 is determined based on the balance between the total thrust Σfs and a force fs3 which is applied for opening the belt contact surface of the movable sheave 37 by the V-belt 35. The reduction ratio of the rotation speed of the driven pulley 34 relative to the rotation speed of the drive pulley 33 is changed continuously and automatically while balancing between Σfs and fs3.

Hereinafter, the cutter mechanism 40 and the cutter blade 14 will be described in detail. As shown in FIG. 4, the cutter mechanism 40 includes the rotation shaft 41 and a transmission mechanism 70. This transmission mechanism 70 will be described later. The rotation shaft 41 extends in a vertical direction of the housing 11. The rotation shaft 41 is positioned in parallel to the output shaft 15a of the engine 15. This rotation shaft 41 is supported by bearings 42, 43 in a manner that the rotation shaft 41 is rotatable but restricted axially with respect to the stand 26. Consequently, the rotation shaft 41 is supported in a manner that the rotation shaft 41 is rotatable with respect to the housing 11, and movement of the rotation shaft 41 in the axial direction is restricted.

The rotation shaft 41 is a hollow shaft. Hereinafter, this rotation shaft 41 will also be referred to as the "hollow shaft 41" as necessary. The lower end 41a of the rotation shaft 41 is positioned within the housing 11. The diameter of this lower end 41a of the rotation shaft 41 is larger than the other portion of the rotation shaft 41. The lower end 41a is opened downward to have a substantially cup shape. The opened end surface in the lower end 41a is closed by a cap 44. The cap 44 is detachably attached to the lower end 41a of the rotation shaft 41 by a fixing member such as a bolt. The inside of the lower end 41a and the cap 44 form a space 45.

Figure 7:
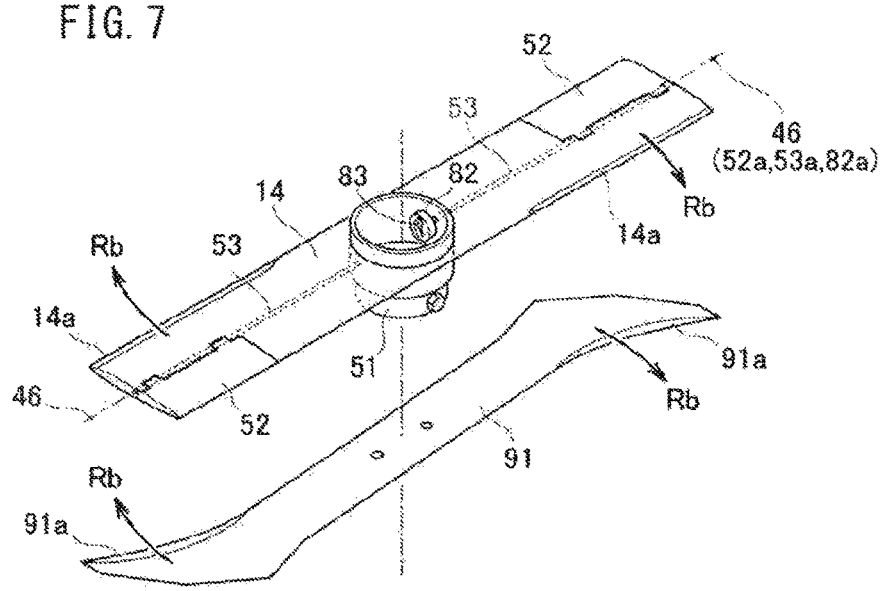
FIG. 7 is an exploded perspective view showing a cutter blade and a lower cutter blade shown in FIG. 3.

As shown in FIGS. 4 and 7, the cutter blade 14 is provided for the rotation shaft 41, and placed in the housing 11. This cutter blade 14 is a long narrow member having a substantially flat plate shape in a plan view, extending in a horizontal line 46 perpendicular to (or substantially perpendicular to) the rotation shaft 41. Both ends of the cutter blade 14 in the longitudinal direction have a pair of blades 14a, at front edges of the cutter blade 14 in the rotation direction.

Further, an annular hub 51 is provided at the center of the cutter blade 14 in the longitudinal direction. The hub 51 is an annular member fitted to an outer circumferential surface of the lower end 41a of the rotation shaft 41. The hub 51 is detachably attached to the lower end 41a by a fixing member such as a bolt. Therefore, the cutter blade 14 is rotatable together with the rotation shaft 41.

Figure 8:
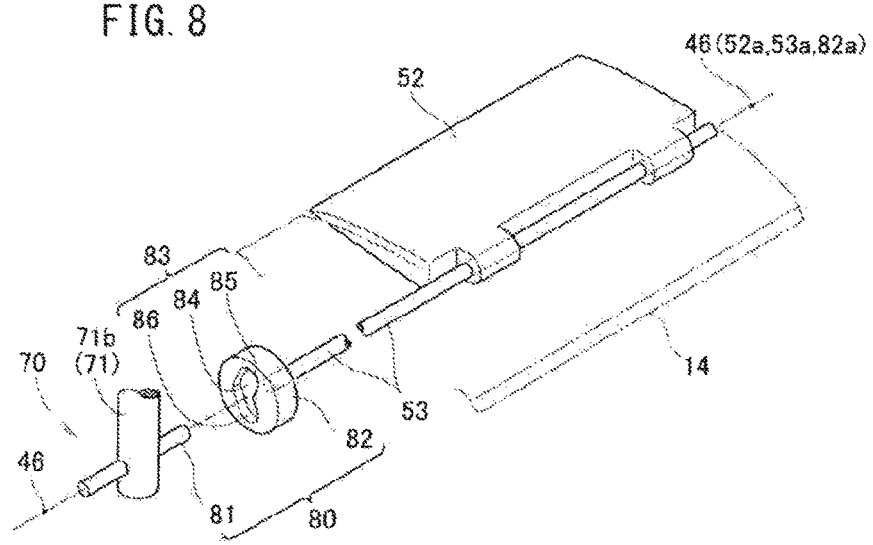
FIG. 8 is an exploded view showing a cutter blade, a flap, and an area around a conversion mechanism shown in FIG. 3.

As shown in FIGS. 3, 7, and 8, flaps 52 are formed at least at part of the cutter blade 14. The range of the flaps 52 in the cutter blade 14 may be any of, only part of the cutter blade 14, the half of the front end of the cutter blade 14, and the entire cutter blade 14.

For example, the flaps 52 are provided at both ends of the cutter blade 14 in the longitudinal direction. The flaps 52 are provided opposite to the pair of blades 14a with respect to the cutter blade 14. The cutter blade 14 is cut out for the space required for providing the flaps 52.

The flap angle (upper and lower swing angles) of the flaps 52 can be changed along the horizontal line 46. More specifically, two flap support shafts 53 (as a pair) are provided on the horizontal line 46. The flap support shafts 53 are provided concentrically with each other. One end of each of the pair of flap support shafts 53 extends through the hub 51, into the space 45 (see FIG. 4) of the lower end 41a of the rotation shaft 41. Further, the one end of each of the pair of the flap support shafts 53 is rotatably supported by the hub 51. The movement of the flap support shaft 53 in the axial direction is restricted.

The pair of flaps 52 is attached to the pair of the flap support shafts 53. In the structure, the flaps 52 can swing in accordance with rotation of the flap support shafts 53 vertically (direction of the upper and lower surfaces of the flaps 52) about the flap support shafts 53. That is, the flaps 52 are auxiliary blades that can swing up and down along the horizontal line 46 (in the longitudinal direction of the cutter blade 14). Hereinafter, the flaps 52 will also be referred to as the "auxiliary blades 52" as necessary.

As shown in FIGS. 3, 5, and 6, the flap angle of the flaps 52 is controlled by a control force of a control force converter unit 60. That is, a control force of the control force converter unit 60 is transmitted to the flaps 52 by the transmission mechanism 70. The control force converter unit 60 converts a displacement force of the movable sheave 37 relative to the fixed sheave 36 into a control force for controlling the flap angle of the flaps 52.

The control force converter unit 60 includes the one pin 39a or the plurality of pins 39a, and one conversion shaft 61. The conversion shaft 61 is fitted into the hollow shaft 41 in a manner that the conversion shaft 61 is slidable in the axial direction of the hollow shaft 41. The conversion shaft 61 includes a protrusion 62 extending downward from its lower end surface, and one or a plurality of screw holes 63 formed on the outer surface of the conversion shaft 61.

The one or the plurality of pins 39a each includes a threaded portion 39d at its front end protruding radially inward from the boss 37a of the movable sheave 37. That is, the pin 39a comprises a bolt. The threaded portion 39d of the pin 39a is screwed into the screw hole 63 of the conversion shaft 61. As a result, the pin 39a couples the movable sheave 37 and the conversion shaft 61. The conversion shaft 61 is rotatable, and slidable in the axial direction together with the movable sheave 37. Therefore, the control force converter unit 60 has composite structure by combination with the torque cam mechanism 39. Thus, the control force converter unit 60 can have simple and compact structure.

As shown in FIG. 4, the transmission mechanism 70 is accommodated inside the hollow shaft 41 (rotation shaft 41).

The transmission mechanism 70 is made up of a control shaft 71 and a conversion mechanism 80.

The control shaft 71 is slidable in the axial direction with respect to the hollow shaft 41, and relative rotation of the control shaft 71 with respect to the hollow shaft 41 is restricted, and the control shaft 71 is fitted into the hollow shaft 41. Specifically, the control shaft 71 is slidable along the hollow shaft 41 by a spline 72, and relative rotation of the control shaft 71 is restricted. It should be noted that the control shaft 71 may adopt structure using serration or parallel keys instead of the spline 72.

As shown in FIGS. 5 and 6, the conversion shaft 61 of the control force converter unit 60 is slidable in the axial direction of the control shaft 71. The conversion shaft 61 and the control shaft 71 are positioned concentrically with the hollow shaft 41. The conversion shaft 61 is combined with an upper end 71a of the control shaft 71 in a manner that the control shaft 71 can be driven in a sliding manner. More specifically, a recess 73 having a circular shape in cross section is formed at an upper end of the control shaft 71. The recess 73 is opened upward. The protrusion 62 of the conversion shaft 61 is fitted to the recess 73. That is, the outer surface of the protrusion 62 is supported by the inner surface of the recess 73 rotatably and slidably.

The lower end surface of the protrusion 62 contacts the bottom surface of the recess 73 rotatably. By downward movement of the conversion shaft 61, it is possible to displace the control shaft 71 in a sliding manner.

As shown in FIG. 4, a lower end 71b of the control shaft 71 extends into the space 45, and faces the upper surface of the cap 44. A compression coil spring 76 (return spring 76) is provided between the lower end surface of the control shaft 71 and the upper surface of the cap 44. The compression coil spring 76 biases the control shaft 71 toward the lower end surface of the protrusion 62 of the conversion shaft 61. Thus, the lower end surface of the protrusion 62 contacts the bottom surface of the recess 73 all the time. By the upward movement of the conversion shaft 61, the compression coil spring 76 can displace the control shaft 71 upward in a sliding manner. Consequently, the control shaft 71 is synchronized with reciprocal movement of the conversion shaft 61, and can slide vertically in the same directions as the conversion shaft 61.

The conversion mechanism 80 is capable of converting the slide movement of the control shaft 71 into movement to change the flap angle of the flaps 52 (see FIG. 3), i.e., swing movement, and the conversion mechanism 80 is accommodated inside the hollow shaft 41 (i.e., the space 45). That is, the lower end 71b of the control shaft 71 is coupled to the flaps 52 through the conversion mechanism 80.

As shown in FIGS. 4, 7 to 9D, this conversion mechanism 80 includes a pin 81 and a pair of cams 82. The pin 81 extends outside toward both sides in the radial direction from the lower end 71b of the control shaft 71. For example, the pin 81 passes through the lower end 71b in the radial direction.

The two cams 82 (as a pair) are circular disk members. Each of the cams 82 is connected to one end of each of the pair of flap support shafts 53. The pair of cams 82 is rotatable about the pair of the flap support shafts 53, and supported at the lower end 41a of the rotation shaft 41. As described above, the pair of cams 82 is rotatably supported by the hollow shaft 41 about a swing center 52a (horizontal line 46) of the flaps 52, and provided at the flaps 52 by the flap support shafts 53.

The cams 82 have cam surfaces 83 which can contact the pin 81. The cam surfaces 83 face each other. The front end of the pin 81 can contact the cam surfaces 83. These cam surfaces 83 are formed by cam grooves which are configured to convert the sliding movement of the pin 81 which is displaced vertically together with the control shaft 71 into the rotation movement of the cams 82. Hereinafter, the cam surfaces 83 will also be referred to as the "cam grooves 83" as necessary. The outer circumferential surface of the pin 81 slides along the side surfaces of the cam grooves 83, and can be displaced vertically. As a result, the cam 82 is rotated.

Figure 9A:
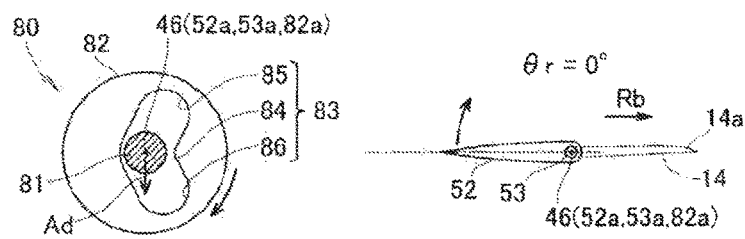
FIG. 9A is a view showing a first relationship between the flap and the conversion mechanism shown in FIG. 6.

As shown in FIGS. 8 and 9A, this cam groove 83 is formed around the swing center 52a of the flap 52, and has a V-shape oriented substantially in a lateral direction. In this regard, the swing center 52a of the flap 52 is in alignment with a center 53a of the flap support shaft 53 and a rotation center 82a of the cam 82. The swing center 52a of the flap 52 is positioned along the horizontal line 46 perpendicular to the rotation shaft 41. More specifically, the cam groove 83 includes a groove center 84 positioned on the rotation center 82a of the cam 82, an upper groove 85 extending upward obliquely from the groove center 84, and a lower groove 86 extending downward obliquely from the groove center 84. The groove center 84, the upper groove 85, and the lower groove 86 are continuous.

Next, operation relationship between the conversion mechanism 80 and the flaps 52 will be described with reference to FIGS. 9A to 9D. FIG. 9A shows the relationship between the conversion mechanism 80 and the flap 52 when the flap 52 is in the horizontal state (flap angle θr=0°). At this time, the pin 81 is positioned at the groove center 84 (the rotation center 82a of the cam 82). The cutter blade 14 is rotated in a direction indicated by an arrow Rb together with the flap 52 in the horizontal state. Thus, the cutter blade 14 can cut (clip) the lawn grass.

Figure 9B:
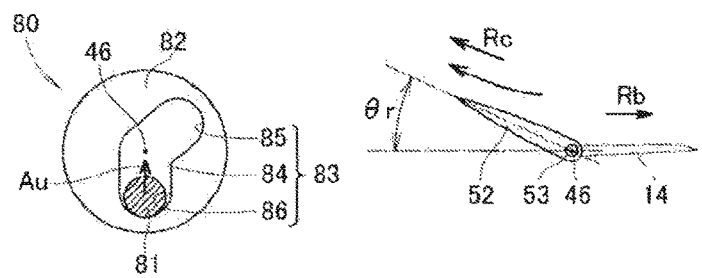
FIG. 9B is a view showing a second relationship between the flap and the conversion mechanism shown in FIG. 6.

Thereafter, the pin 81 is displaced downward (in a direction indicated by an arrow Ad) together with the control shaft 71 shown in FIG. 8, to push the side wall of the lower groove 86 of the cam groove 83 downward. Since the cam 82 and the flap support shaft 53 are rotated clockwise, the flap 52 swings upward. The result is shown in FIG. 9B. The degree of the swing angle θr at which the flap 52 swings from the horizontal state, i.e., the degree of the flap angle θr corresponds to the downward displacement amount of the control shaft 71. By rotation of the cutter blade 14, the flap 52 generates upward air flow Rc.

Thereafter, the pin 81 is displaced upward (in a direction indicated by an arrow Au) together with the control shaft 71 shown in FIG. 8. The pin 81 is in the so-called "missed swing" state where the pin 81 is only displaced upward in the lower groove 86 until the pin 81 returns to the groove center 84. Therefore, the flap angle θr of the flap 52 does not change.

Figure 9C:
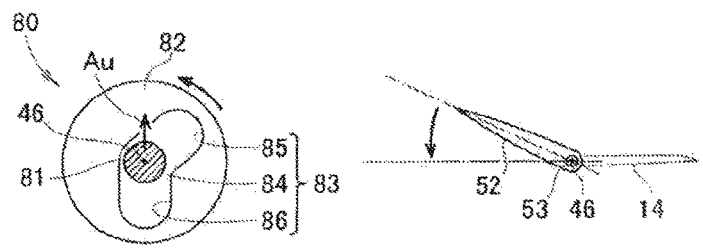
FIG. 9C is a view showing a third relationship between the flap and the conversion mechanism shown in FIG. 6.
Figure 9D:
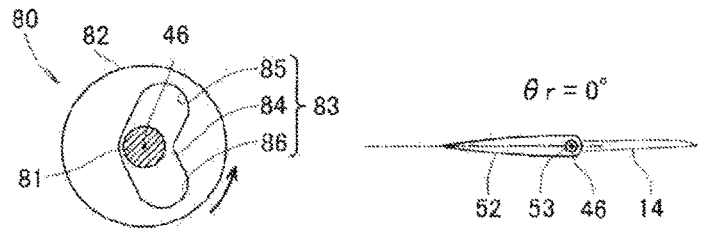
FIG. 9D is a view showing a fourth relationship between the flap and the conversion mechanism shown in FIG. 6.

Thereafter, as shown in FIG. 9C, the pin 81 is displaced further upward from the groove center 84 (in a direction indicated by an arrow Au) to push the side wall of the upper groove 85 upward. Since the cam 82 and the flap support shaft 53 are rotated counterclockwise in the drawing, the flap 52 swings downward. The result is shown in FIG. 9D. The flap 52 returns to the horizontal state (flap angle θr=0°).

The above explanation can be summarized as follows: As shown in FIGS. 5, 7 and 9A to 9D, the movable sheave 37 is displaced to move closer to, and away from the fixed sheave 36 in accordance with the increase/decrease of the lawn mowing load applied to the cutter blade 14. The effective diameter of the driven pulley 34 changes in accordance with the displacement amount of the movable sheave 37. As a result, it is possible to change the reduction ratio of the driven pulley 34 relative to the drive pulley 33 continuously. Further, the displacement force of the movable sheave 37 is transmitted to the flaps 52 through the control force converter unit 60 and the transmission mechanism 70. As a result, it is possible to continuously change the flap angle θr of the flaps 52 in accordance with the displacement amount of the movable sheave 37. As described above, it is possible to change the rotation speed of the cutter blade 14 automatically, and automatically change the flap angle θr of the flap 52 automatically, in accordance with the increase/decrease of the lawn mowing load.

That is, in accordance with the increase of the lawn mowing load, the movable sheave 37 moves away from the fixed sheave 36. As a result, it is possible to reduce the rotation speed of the cutter blade 14, and hence, reduce the load on the cutter blade 14. Further, it is possible to increase the flap angle θr of the flaps 52 (change the orientation of the flaps 52 to stand upright). Therefore, even if the rotation speed of the cutter blade 14 is reduced, it is possible to efficiently generate the swirl wind for swirling the lawn grass (grass clippings) cut by the cutter blade 14 in the housing 11, and transporting the grass clippings into the grass clippings container 22. Further, there is no need to adopt complicated control system for changing the rotation speed of the cutter blade 14 and the flap angle θr of the flaps 52 automatically, and hence, it is sufficient to adopt a simple mechanism.

Further, during the operation at low load where, e.g., the cutter blade 14 is rotated idly, and no grass clipping operation is performed, by decreasing the flap angle θr of the flaps 52, it is possible to reduce the noises such as wind noises. Further, it is possible to improve the noise suppression performance regardless of the rotation speed of the cutter blade 14.

Further, as shown in FIG. 4, the transmission mechanism 70 is accommodated inside the hollow shaft 41. That is, the transmission mechanism 70 is provided by utilizing the rotation shaft 41 effectively. By accommodating the transmission mechanism 70 in the hollow rotation shaft 41, it is possible to efficiently provide the transmission mechanism 70 in a compact space in the housing 11 efficiently. Further, since the transmission mechanism 70 is not exposed into the housing 11, there is no concern of jamming between the transmission mechanism 70 and the housing 11. Further, the swirl wind generated by the cutter blade 14 or the flaps 52 can flow smoothly into the housing 11 without being obstructed by the transmission mechanism 70. Therefore, though the transmission mechanism 70 is present, it is possible to store the grass clippings efficiently in the grass clippings container 22 by allowing the grass clippings to fly over the swirl wind which flows smoothly.

Further, as shown in FIG. 4, the transmission mechanism 70 includes the control shaft 71 and the conversion mechanism 80. The lower end 71b of the control shaft 71 is coupled to the flaps 52 through the conversion mechanism 80. The conversion shaft 61 of the control force converter unit 60 is combined with the upper end 71a of the control shaft 71 in a manner that the control shaft 71 can be driven to move in a sliding manner.

Thus, the control shaft 71 is driven by the control force converter unit 60 to move in a sliding manner, and the sliding movement of the control shaft 71 can be converted by the conversion mechanism 80 into movement to change the flap angle θr of the flaps 52. As a result, the flap angle θr can be controlled by the control force converter unit 60. Further, the transmission mechanism 70 is made up of the control shaft 71 fitted into the hollow shaft 41 in a slidable manner in the axial direction, and the conversion mechanism 80 accommodated inside the hollow shaft 41. Therefore, the transmission mechanism 70 can be accommodated efficiently in the rotation shaft 41, by effectively utilizing the inner space of the hollow rotation shaft 41.

Further, as shown in FIG. 4, by the cam mechanism made up of the pin 81 and the cams 82, it is possible to form the simple and compact conversion mechanism 80. Further, the sliding movement of the control shaft 71 can be converted into movement of changing the flap angle θr of the flaps 52 promptly.

Further, as shown in FIGS. 4 and 8, the cam groove 83 is formed in a V-shape substantially oriented laterally, around the swing center 52a of the flaps 52. In the structure, by changing the slide direction of driving the control shaft 71 by the control force converter unit 60, it is possible to change the swing direction of the flaps 52. For example, the swing direction of the flaps 52 can be changed from upward to downward. In this case, by reversing rotation of the rotation shaft 41, it is possible to generate an upward air flow by the flaps 52. As described above, the swing direction of the flaps 52 and the rotation direction of the rotation shaft 41 can be combined as necessary, in accordance with the usage condition of the lawn mower 10.

In this regard, when the cutter blade 14 having the flaps 52 shown in FIGS. 1 and 3 is rotated, it is possible to generate the upward air flow by the flaps 52. The magnitude of this upward air flow depends on the degree of the flap angle θr of the flaps 52. Negative pressure is generated below the cutter blade 14 by the upward air flow. In correspondence with the magnitude of this negative pressure, the degree in which the lawn grass growing on the lawn ground Gr (ground Gr) stands upright changes. For ensuring that the lawn grass after lawn mowing operation has a constant height as much as possible, it is more preferable to adjust the height of the housing 11 having the cutter blade 14 finely.

In this regard, as shown in FIGS. 3 and 7, a lower cutter blade 91 is positioned below the cutter blade 14. This lower cutter blade 91 comprises a fixed blade fixed to the rotation shaft 41 (hollow shaft 41). That is, the lower cutter blade 91 is removably attached to the cap 44 by a fixing member such as a bolt. In the structure, the lower cutter blade 91 is rotatable together with the rotation shaft 41. This lower cutter blade 91 is a narrow and long member having a substantially flat plate shape in a plan view, and basically extends along the cutter blade 14. This lower cutter blade 91 may be positioned in slightly out of phase with the cutter blade 14. Two blades 91a (as a pair) are provided at both ends of the lower cutter blade 91 in the longitudinal direction. The blades 91a are formed on the front edges of the lower cutter blade 91 in the rotation direction Rb.

Therefore, the magnitude of the negative pressure generated below the lower cutter blade 91 by the upward air flow is substantially constant. The degree in which the lawn grass growing on the lawn ground Gr (ground Gr) stands upright is substantially constant. It is possible to keep the height of lawn grass after lawn mowing operation as constant as possible.

Therefore, it is possible to efficiently generate the swirl wind by the flaps 52 of the upper cutter blade 14, and ensure that the lawn grass has the constant height after lawn mowing operation by the lower cutter blade 91 as much as possible.

The lawn mower 10 of the present invention is suitably adopted as a walk-behind lawn mower.

While the invention has been particularly shown and described with reference to a preferred embodiment, it will be understood that variations and modifications can be effected thereto by those skilled in the art without departing from the scope of the invention as defined by the appended claims.

What is claimed is:

1. A lawn mower comprising:
   a housing including an opened bottom;
   a rotation shaft extending in a vertical direction of the housing and having a lower end positioned within the housing;
   a cutter blade provided for the rotation shaft, and accommodated in the housing; and
   a belt type continuously variable transmission provided in a working power transmission system from a drive source to the rotation shaft, the belt type continuously variable transmission capable of changing a reduction ratio of a driven pulley to a drive pulley in a continuous manner,
   wherein the cutter blade extends along a horizontal line which is perpendicular to the rotation shaft;
   the driven pulley includes a fixed sheave provided for the rotation shaft, a movable sheave which is displaceable relative to the fixed sheave in an axial direction, and a torque cam mechanism configured to partially convert a rotation force applied to the movable sheave into a thrust that presses a side surface of a V-belt; and
   the lawn mower further comprises:
   a flap provided for at least part of the cutter blade, the flap having a flap angle changeable along the horizontal line;
   a control force converter unit configured to convert a displacement force of the movable sheave relative to the fixed sheave in the axial direction into a control force that controls the flap angle of the flap; and
   a transmission mechanism configured to transmit the control force of the control force converter unit to the flap, and
   wherein the rotation shaft comprises a hollow shaft; and the transmission mechanism is accommodated inside the hollow shaft.

2. The lawn mower according to claim 1,
   wherein the transmission mechanism comprises:
   a control shaft fitted into the hollow shaft, the control shaft being slidable in the axial direction;
   a converter mechanism accommodated inside the hollow shaft in a manner that sliding movement of the control shaft can be converted into movement to change the flap angle of the flap;
   a lower end of the control shaft is coupled to the flap through the converter mechanism; and
   a conversion shaft of the control force converter unit is combined with an upper end of the control shaft in a manner that the control shaft can be driven in a sliding manner.

3. The lawn mower according to claim 2, wherein the converter mechanism comprises a pin extending radially outside from the lower end of the control shaft and a cam including a cam surface which can contact the pin;
   the cam is supported by the hollow shaft rotatably about a swing center of the flap and provided at the flap; and
   the cam surface comprises a cam groove capable of converting sliding movement of the pin which is displaced in a sliding manner together with the control shaft into rotation movement of the cam.

4. The lawn mower according to claim 1, further including a lower cutter blade positioned below the cutter blade; and
   the lower cutter blade comprises a fixed blade fixed to the hollow shaft.

* * * * *